Figure 1:
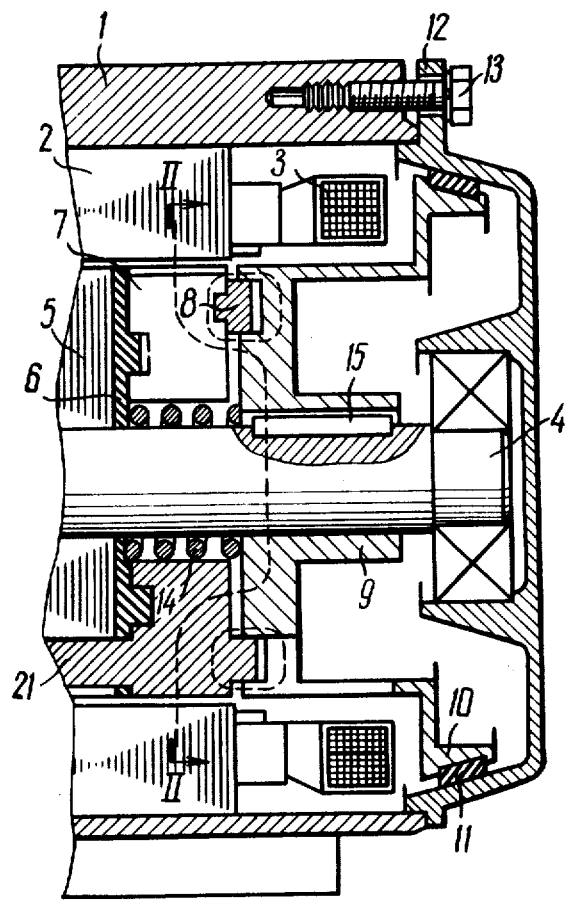

United States Patent
Agalakov et al.

[15] 3,683,217
[45] Aug. 8, 1972

[54] BRAKE INDUCTION MOTOR

[72] Inventors: Viktor Iosifovich Agalakov; Eduard Mitrofanovich Guselnikov; Viktor Gavrilovich Smaikin, all of Tomsk, U.S.S.R.

[73] Assignee: Spetsialnoe Konstruktorskoe Bjuro Elektromashinostroenia, Tomsk, U.S.S.R.

[22] Filed: March 29, 1971

[21] Appl. No.: 128,858

[52] U.S. Cl. .................................. 310/77, 310/211
[51] Int. Cl. ............................................. H02k 7/102
[58] Field of Search ........................... 310/77, 211

[56] References Cited

UNITED STATES PATENTS

| | | | |
|---|---|---|---|
| 3,407,319 | 10/1968 | Arraiza | 310/77 |
| 3,502,918 | 3/1970 | Done et al. | 310/77 |

*Primary Examiner*—D. X. Sliney
*Attorney*—Waters, Roditi, Schwartz & Nissen

[57] ABSTRACT

The electric motor according to the invention is characterized in that the additional core of the rotor is made of radially arranged metal plates fastened to one another by a non-magnetic alloy.

The motor has increased reliability in service and enables the use of simplified techniques in the manufacture and assembly of the additional rotor core.

3 Claims, 6 Drawing Figures

BRAKE INDUCTION MOTOR

The present invention relates to a brake induction motor in which the built-in brake system is controlled by means of the magnetic circuit of the motor itself.

It is known to use brake induction motors in which the brake system is controlled by the electromagnetic field set up by the short-circuiting end ring of the rotor cage, made up of a main and an additional core separated by a non-magnetic distance piece, and by the electromagnetic field of the stator, axially directed by the additional core of the rotor structure (see, for example, FRG Pat. No. 943,071, Class 21d', 42).

A disadvantage of this prior-art brake induction motor lies in the difficulties associated with the manufacture of the additional core of the rotor structure. It is fabricated from a substantial bar having a milled groove for the short-circuiting end ring of the rotor cage and milled radial slots for the bars of the rotor cage. Besides, this substantial part of the rotor impairs the performance of the motor in terms of power output.

To minimize these difficulties, a different construction of a brake induction motor has been proposed, in which the additional core of the rotor structure is assembled from rotor core laminations bent at right angles (see, for example, West German Pat. No. 1,047,922, Class 21d', 42).

Practice has shown that the effects of the additional rotor core on the performance of the motor have considerably been minimized, but it is likewise difficult to fabricate, because each lamination of the additional rotor core must be punched in a separate die and punch because of the difference in inside diameters.

Another disadvantage of this prior-art construction is that the core may be unbladed by the impacts of the armature and the punchings may jut out into the air gap.

It is an object of the present invention to avoid the above-mentioned disadvantages.

Another object of the invention is to provide a brake induction motor the additional rotor core of which is simpler in design as compared with the prior-art constructions and does not pose appreciable difficulties in its assembly.

With these objects in view, the invention resides in that in a brake motor whose shaft carries a squirrel-cage rotor made up of a main core and an additional core separated from the former by a non-magnetic distance piece and carrying a short-circuiting end ring, and a movable armature attracted to the additional rotor core magnetically as the stator is excited, according to the invention the additional rotor core is made of radially arranged metal plates fastened to one another and to the non-magnetic distance piece by a non-magnetic alloy.

To obtain closed slots, the said laminations may be made L-shaped.

The non-magnetic distance piece should preferably have radial slots to anchor the laminations of the additional rotor core.

An advantage of the present invention resides above all in that the fabrication of parts for the additional rotor core and its assembly are simplified.

Another advantage of the present invention is that the service life and reliability of the motor are enhanced owing to the simpler construction of the additional rotor core.

Figure 2:
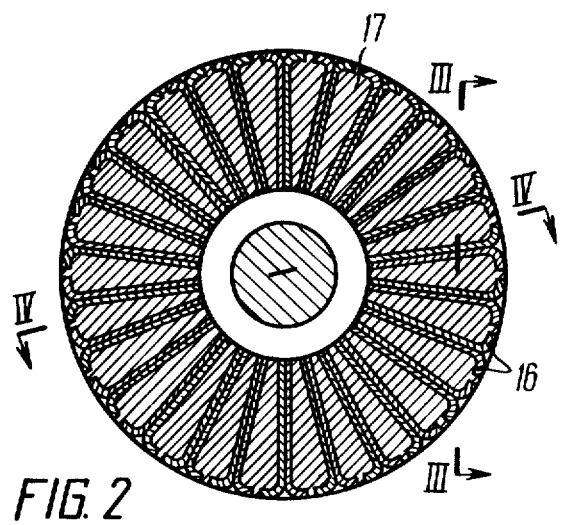
Figure 3:
Figure 4:
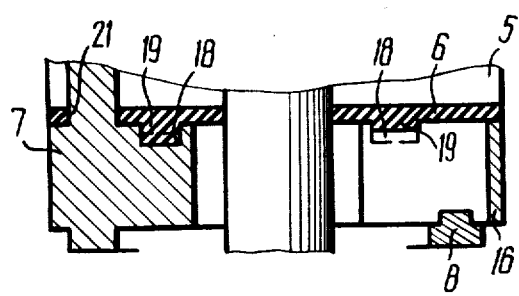
Figure 5:
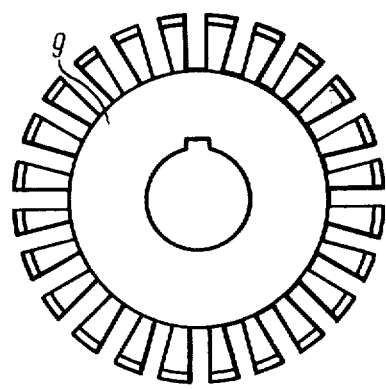
Figure 6:
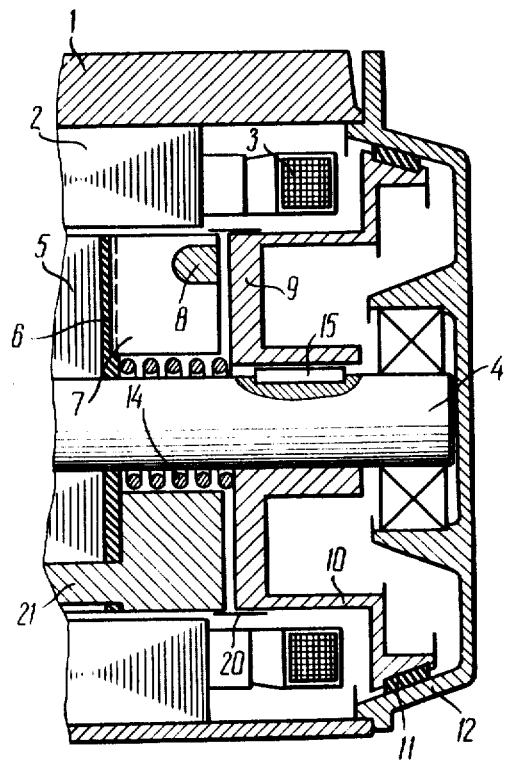

The invention will be more fully understood from the following description of a preferred embodiment when read in connection with the accompanying drawings wherein:

FIG. 1 shows a partial cross-sectional view of a brake induction motor according to the invention;
FIG. 2 shows section II—II of FIG. 1;
FIG. 3 shows section III—III of FIG. 2;
FIG. 4 shows section IV—IV of FIG. 2;
FIG. 5 shows the armature from the rotor side;
FIG. 6 shows a partial cross-sectional view of another embodiment of the motor according to the invention.

Referring to FIG. 1, there is a brake induction motor the frame 1 of which encloses a stator 2 and a stator winding 3. The shaft 4 of the motor mounts a main rotor core 5 and an additional rotor core 7 separated from the main one by a non-magnetic distance piece 6 and carrying at its end a short-circuiting end ring 8 of the squirrel-cage rotor structure. The shaft 4 also mounts an armature 9 made integral with a brake disc 10 carrying brake blocks 11 which interact with the inner surface of an end shield 12 which also acts as the stationary part of the brake.

The end shield 12 is fastened to the frame 1 by bolts 43.

The armature 9 can be shifted on the shaft 4 axially under the action of a spring 14 or the electromagnetic field. A key 15 holds the armature 9 from slipping on the shaft 4.

The additional rotor core 7 is made up of radially arranged plates 16 (FIG. 2) fastened to one another and to the non-magnetic distance piece 6 by a non-magnetic alloy 17 cast between the plates. The number of plates 16 per row will be found by calculation. In FIG. 2 the plates are shown arranged in pairs.

To facilitate the assembly of the additional rotor core and to improve the fixation of the plates, the non-magnetic distance piece 6 has slots 18 (FIG. 3) which accept the ends of plates 16. There are as many slots 18 as there are teeth in the main rotor core 5. Sometimes, it may be preferable to provide the non-magnetic distance piece 6 with a circular shoulder 19 (FIG. 4). In such a case, the slots 18 will be made in that shoulder.

According to whether the slots between the plates on the outer diameter of the core should be open or closed, the plates 16 can be made flat or L-shaped (FIG. 2 shows L-shaped plates). The short-circuiting end ring 8 of the squirrel-cage structure may be sunk in the end of the additional rotor core 7 only partly, as shown in FIG. 1, or fully, as shown in FIG. 6. The former arrangement is used when the armature 9 has longitudinal slots on the outer surface (FIG. 5) so as to increase the magnetic pull on the armature. The latter arrangement is used when there is no need for an increased magnetic pull on the armature 9 and the latter has a continuous outer surface.

At the same time, a possibility presents itself to cushion the impacts of the armature 9 against the end of the additional rotor core 7, for which purpose a sleeve 20 (FIG. 6) is put over the outer surface of the armature 9, which slides on the outer surface of the additional rotor core 7 as the armature moves. Owing to this, the air cushion between the end of the additional rotor core 7 and the end of the armature 9 acts as a dash-pot, so that the motor is unbraked gradually and without impacts. With this embodiment, the construction of the armature 9 may be simplified, and its end facing the additional core 7 may be made flat.

Metal is cast in the slots of the additional rotor core 7 at the same time with the main rotor core 5, so that the short-circuiting end ring 8, the non-magnetic alloy between the plates 16, the bars 21 of the rotor cage, and the other short-circuiting end ring (not shown) of the main rotor core 5 make up an integral structure.

The brake induction motor disclosed herein operates as follows.

When mains power is applied to the winding 3 of the stator 2, a starting current begins to flow in the short-circuiting end ring 8, giving rise to a strong magnetic flux. Under the action of this magnetic flux, the armature 9 is attracted to the end of the additional rotor core 7, the blocks II of the brake disc 10 come out of contact with the end shield 12 serving as the stationary part of the brake, and the shaft 14 is unbraked. As the armature 9 moves towards the additional rotor core 7, the sleeve retards the escape of air from the air gap between the ends of the core 7 and the armature 9, so that an air cushion forms between them, moderating the impact of the armature 9 against the end of the core 7. After the motor has been brought up to its rated speed, the current in the short-circuiting end ring 8 decreases, and so does the magnetic flux around it.

At the same time, there is an increase in the main magnetic flux of the motor stator. Part of the magnetic flux has its path through the additional rotor core in an axial direction, and it is sufficient to keep the armature 9 attracted.

After the motor is turned off, all magnetic fluxes collapse, the armature 9 is no longer attracted, and the spring 14 moves it away from the end of the additional rotor core 7 and forces the brake disc 10 and brake blocks II against the end shield 12, which is the stationary part of the brake. The shaft 4 of the motor is braked.

The embodiment of the present invention described above does not exhaust all the possible embodiments claimed in the appended claims.

The practical realization of the present invention has confirmed the relative simplicity of the manufacture and assembly of the additional rotor core, and also other advantages described above.

What is claimed is:

1. A brake induction motor comprising a stator; a rotor mounted on the motor shaft, said rotor comprising a main core and an additional core, a non-magnetic distance piece separating said main core and said additional core; a squirrel cage for the rotor having bars of variable configuration depending upon whether they are arranged on the main or on the additional rotor core, and short-circuiting end rings, one of which is disposed at the end of the main rotor core and the other, at the end of the additional rotor core; said additional rotor core being assembled from plates arranged radially in axial planes, means fastenings said plates together and with the main rotor core and with the non-magnetic distance piece, said means comprising a non-magnetic alloy of the rotor cage; a movable armature being mechanically coupled with a brake means and being arranged on the motor shaft, said armature being attracted to the end of the additional rotor core after said stator is excited under the action of an electromagnetic field of the stator and a field produced by the current of the short-circuiting end ring of the rotor, the armature being held attracted to the core by a magnetic flux flowing through said plates of the additional rotor core and the armature.

2. A brake induction motor, as claimed in claim 1, in which said plates of the additional rotor core are L-shaped.

3. A brake induction motor, as claimed in claim 1, in which said non-magnetic distance piece has radial slots to anchor said plates of the additional rotor core.

* * * * *